United States Patent [19]
Schandl et al.

[11] Patent Number: 5,331,481
[45] Date of Patent: Jul. 19, 1994

[54] TAPE DRIVE AND WINDING MECHANISM FOR TAPE PLAYER/RECORDER

[75] Inventors: Hartmut Schandl, Vienna; Fritz Weisser, St. Georgen, both of Austria

[73] Assignee: Deutsche Thomson-Brandt GmbH, Villingen-Schwenningen, Fed. Rep. of Germany

[21] Appl. No.: 774,964

[22] Filed: Oct. 10, 1991

[30] Foreign Application Priority Data

Apr. 13, 1989 [DE] Fed. Rep. of Germany ....... 3912098
Oct. 21, 1989 [DE] Fed. Rep. of Germany ....... 3935150

[51] Int. Cl.$^5$ .............................................. G11B 5/027
[52] U.S. Cl. .................................................. 360/85
[58] Field of Search ................................... 360/85, 90

[56] References Cited

U.S. PATENT DOCUMENTS

| | | | |
|---|---|---|---|
| 3,690,198 | 9/1972 | Huber | 74/785 |
| 4,388,658 | 6/1983 | Kajino et al. | 360/85 |
| 4,492,994 | 1/1985 | Suda et al. | 360/85 |
| 4,711,410 | 12/1987 | Gwon | 242/201 |

FOREIGN PATENT DOCUMENTS

| | | |
|---|---|---|
| 105501 | 4/1984 | European Pat. Off. . |
| 192448 | 8/1986 | European Pat. Off. . |
| 212720 | 3/1987 | European Pat. Off. . |
| 2816699 | 11/1978 | Fed. Rep. of Germany . |
| 57-12444 | 1/1982 | Japan . |
| 57-141058 | 9/1982 | Japan . |
| 87952 | 9/1983 | Japan . |
| 1199738 | 7/1970 | United Kingdom . |

Primary Examiner—David C. Nelms
Attorney, Agent, or Firm—Joseph S. Tripoli; Joseph J. Laks; Francis A. Davenport

[57] ABSTRACT

A tape player/recorder device for a tape cassette includes a winding reel driven by a capstan motor through a tumbler gear. The shaft of the motor is outside of the cassette. The tape player/recorder device also includes a plurality of threading elements, an idler roller, a plurality of threading elements and a threading motor for threading the tape into the player/recorder. A planet gear is responsive to the capstan motor and is in engagement with the tumbler gear. A slip coupling enables the selective by-passing of the planet gear.

20 Claims, 4 Drawing Sheets

TAPE DRIVE AND WINDING MECHANISM FOR TAPE PLAYER/RECORDER

This is a continuation of PCT application PCT/EP 90/00535 filed Apr. 5, 1990 by Hartmut Schandl and Fritz Weisser and titled Tape Player With a Winding Head And Tape Drive.

Video and audio recorders record and play information on a tape which is supported on the reels of a cassette. With existing video recorders having a rotating head cylinder, it is necessary to draw tape out of the cassette by means of a threading mechanism and, with the help of guides, to place the tape against the perimeter of the head cylinder. The threading is performed by a threading motor which places the magnetic tape into the playing position, for example, by means of a threading carriage driven through a cam disc. An additional motor, which can be a capstan motor drives the reels. A tumbler gear is coupled to the take-up reel and the feeding reel maintains the required tape tension by means of a friction brake. A uniform tape tension is required throughout the full length of the tape, and accordingly the tape tension is monitored by a tension sensor and utilized to adjust the braking of the feeding reel.

It is known that a capstan motor shaft extends into the cassette. It is also known that the reel platters can comprise a slip coupling and be driven by the capstan motor via a belt-driven tumbler gear. The drive operates on the drive side of the slip coupling. Uniform tape tension is maintained through the slip coupling acting in combination with a belt wrap brake which is controlled by the tape tension sensor, and which operates on the coupling side of the feeding reel. Speed changes of the winding reel can be effected by driving the tumbler gear through one or more intermediate gears which are brought into mesh by a link motion, for example.

A type of recorder is known in which the capstan shaft is located outside the cassette and a rubber idler (RI) roller extends into the cassette. During operation, the RI roll follows the magnetic tape by means of threading elements and the tape is driven by the external capstan shaft. In such an arrangement the direction of rotation of the capstan shaft does not correspond with the direction of rotation of the tumbler gear, which is driven by an intermediate wheel and the rotational direction of the tumbler gear must be reversed, for example by an additional intermediate wheel.

The invention is directed to a recorder having a capstan motor located outside the cassette and which reverses the direction of rotation of the tumbler gear in a simple straightforward manner, which requires a simplified slip coupling, and which simplifies the speed adjustment of the winding reels.

With the invention, a capstan motor, which is located outside the cassette, drives a planet gear through a rubber belt. The planet gear is associated with a tumbler gear. The gearing mechanism includes an integrated slip coupling the operation of which can be adjusted by a lever and disc cam arrangement to control the reel speed for the various modes of operation. The coupling includes a ring-shaped piece of felt and operates between a non-rotatable control ring, the height of which is adjustable, and a rotatable planet gear carrier, the height of which is also adjustable. A pressure spring presses the bottom side of the planet ring carrier onto a clutch disc. The planet gears are freely rotatable. The planet gears mesh with a sun wheel which is driven via a belt disc. The planet gears also mesh with a bell wheel which in turn drives a tumbler gear. The planet gear carrier effects an auto-rotation dependent on the moment which is transmitted from the bell wheel to the tumbler gear. Accordingly when the planet gear carrier is stopped or slowed by an adjustable clutch, a defined transmission moment is applied to the winding reels by the tumbler gear. It therefore is possible to design the winding reels without their own slip coupling.

Different transmission moments are required in the different modes of operation for a constant tape tension. In the play mode (recording and reproduction) a relatively small transmission moment is needed to drive the take-up reel. The slow play speed is obtained from stepped down gearing while the planet gear carrier is stopped by a slip coupling. When the transmission moment rises the slip coupling starts to slip, because the planet gear effects an auto-rotation at low speed in the turning direction of the driving belt disc. The slip coupling thus limits the transmission moment and a desired tape tension is maintained.

In the backward search mode, a larger transmission moment is required because of the longer tape distance between the driving capstan shaft and the winding reel. In order to achieve a larger transmission moment a control unit which carries the slip coupling, is moved closer to the planet gear by a threading motor and the contact pressure at the slip coupling increases and the turning moment also increases.

In the winding mode (fast forward and rewinding) the planet gear is by-passed in response to the threading motor. This is achieved by changing the position of the planet gear carrier. That is, the nonrotatable control unit which, is supported by the spring force of the concentric pressure spring, is lowered and the planet gear carrier and nubs on the planet gear carrier mesh with recesses in the belt disc. Hence, the axes of the planet gear carriers are connected to the belt disc and the turning belt disc directly drives the bell wheel via the planet wheels. Such operation can be performed when the tape is disengaged from the head cylinder and thus is not being driven. Accordingly, only the RI roll must be lifted off the capstan shaft.

The process described for the winding mode can also be carried out when reversal of the turning direction is required. Accordingly, it is possible to guide the tumbler gear from one winding reel to the other by means of the capstan motor in a short time and without the tension of the tape being changed. This technique of reversing the turning direction is disadvantageous in that the reproduction of still pictures with single step-by-step motion is not possible because several single pictures can be missed when the RI roll is lifted off the tape. In order to obtain a reversal of the turning direction with the RI roll in the contact position and without a change in the tension of the tape, the reversal is performed by the threading motor. This is accomplished by turning the planet gear carrier through a selected angle to adjust the height of a control ring, which can be reached from outside and which is locked in with the axes of the planet wheels, via the clutch facing to be adjusted by the threading motor through a gearing mechanism. With this process the control ring changes its predetermined height to reach the required tape tension when the capstan motor starts after the reversing is completed.

Figure 1:
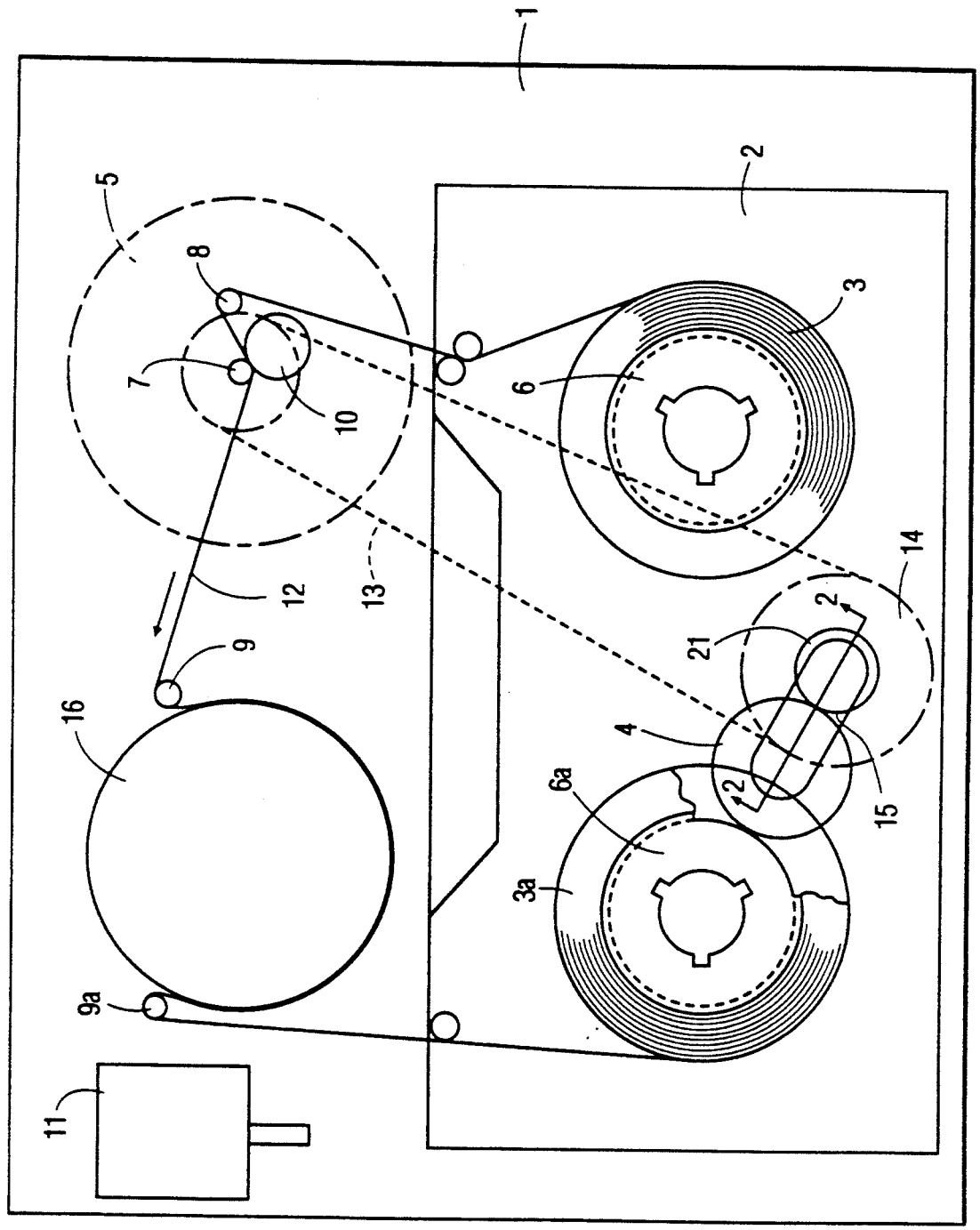
FIG. 1 is a top view of a preferred embodiment.

FIG. 1 shows, in a schematic representation, the winding and tape drive for a tape cassette 2 which is arranged in a tape drive chassis 1. The tape 12 is pulled out of the cassette 2 by a threading motor 11 via threading elements 8, 9 and 9a using guides (not shown) and is positioned around a head cylinder 16. A capstan motor 5 is located outside the cassette 2. The shaft 7 of motor 5 drives the tape 12 in cooperation with a rubber idler (RI) roller 10 which urges the tape against the capstan shaft 7. Capstan motor 5 also drives the planet gear 14 via a belt 13. A tumbler gear 4 drives the supply reel platter 6a of the tape roll 3a to pull the tape in the direction shown by the arrow. Tumbler gear 4 meshes with a bell wheel 21 of the planet gear 14. In the backward search mode of operation the tape 12 is driven by the capstan motor 5 in cooperation with the RI roller 10. In the rewind mode the RI roller 10 is lifted off the capstan shaft by the threading motor 11. For this mode of operation, the rotation of capstan motor must be reversed because, as described with respect to FIG. 2, the planet gear 14 is not utilized in this mode.

Figure 2:
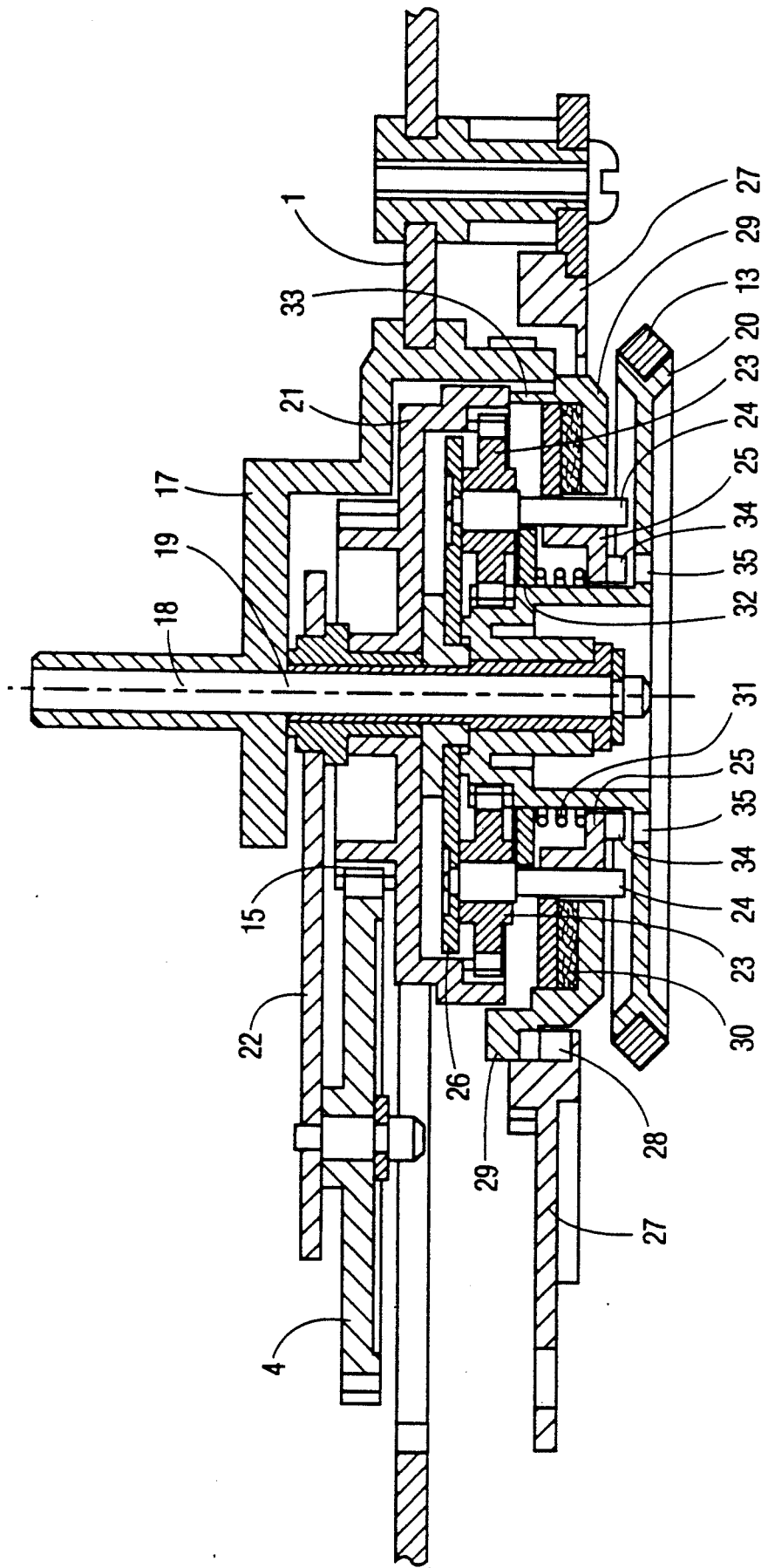
FIG. 2 is a cross section taken on line 2—2 of FIG. 1.

FIG. 2 is a cross section of the planet gear 14 provided with a slip coupling. The planet gear is affixed to the chassis 1 through a holder block 17. The center axis 18, within a cylinder 19, serves as the rotational axis for a sun wheel 20 and for the bell wheel 21, which drives the tumbler gear 4. The tumbler gear 4, is rotatably mounted on a tumbler gear lever 22.

The transmission of the turning moment is performed by planet wheels 23 (gears) which mesh the sun wheel 20 and the bell wheel 21. The planet wheels 23 are rotatable on shafts 24. The planet wheels 23 are also rotatably supported in an upper planer carrier 26 and a lower planet carrier 25. The planet carriers 25, 26 are equiangularily spaced about the gearing axis 18 and can perform an auto-rotation around this axis.

The planet carrier 26 has a fixed height in a direction parallel to axis 18. The height of the lower planet carrier 25 is adjustable in a direction parallel to axis 18. The height adjustment occurs through a lever 27 and a ramp 28 which is slidable by means of the threading motor 11. Ramp 28 acts upon a non-rotatable control ring 29 causing the height to be adjusted. A ring of felt 30, which serves as the clutch facing for the slip coupling is arranged between the height adjustable control ring 29, which forms part of the coupling, and the lower planet carrier 25. The contact pressure for the coupling is applied by a concentric pressure spring 31, which operates between the lower planet carrier 25 and a metal ring 32. Thus by varying the height of control ring 29, the contact pressure applied to the coupling by concentric pressure spring 31 is varied. The metal ring 32 rests on a step provided in the planet wheel shaft 24.

A predetermined speed of the winding reels for the "play operation" is obtained because the planet gear 21 has a step down between the sun drive 20 and the side of the tumbler gear 4. A higher speed, which is desired for the tape winding mode, is obtained by eliminating the effects of the planet gear. To this end, the lower planet wheel ring 25 can be lowered by lever 27 and the height adjustable control ring 29, which is secured against auto-rotation by means of the stopping nose 33, and the nubs 34 enter the recesses 35 of the sun drive 20. The planet wheels 23 are then driven at the speed of the sun drive 20 and the planet wheels 23 transmit this speed to the bell wheel 21. The elimination or bypassing of the use of the planet gear can also be utilized when a change of operating mode requires reversal of the winding drive direction. It is possible to use the capstan motor to swing the tumbler gear 4 from one winding reel to the other without changing the tape tension while the tape 12 is not "threaded in" and the RI roll 10 is lifted off the tape. For high quality recorders with single picture presentation this type of rotation reversal is not practicable. The lifting off of the RI roll 10 and the swinging of the tumbler gear 4 make it difficult to maintain the position of the last shown picture with certainty. For this reason, with high quality recorders the reversal of the rotation direction of the tumbler gear is controlled by the threading motor 11 via the cam disc 36 and with the RI roll 10 in contact.

Figure 3:
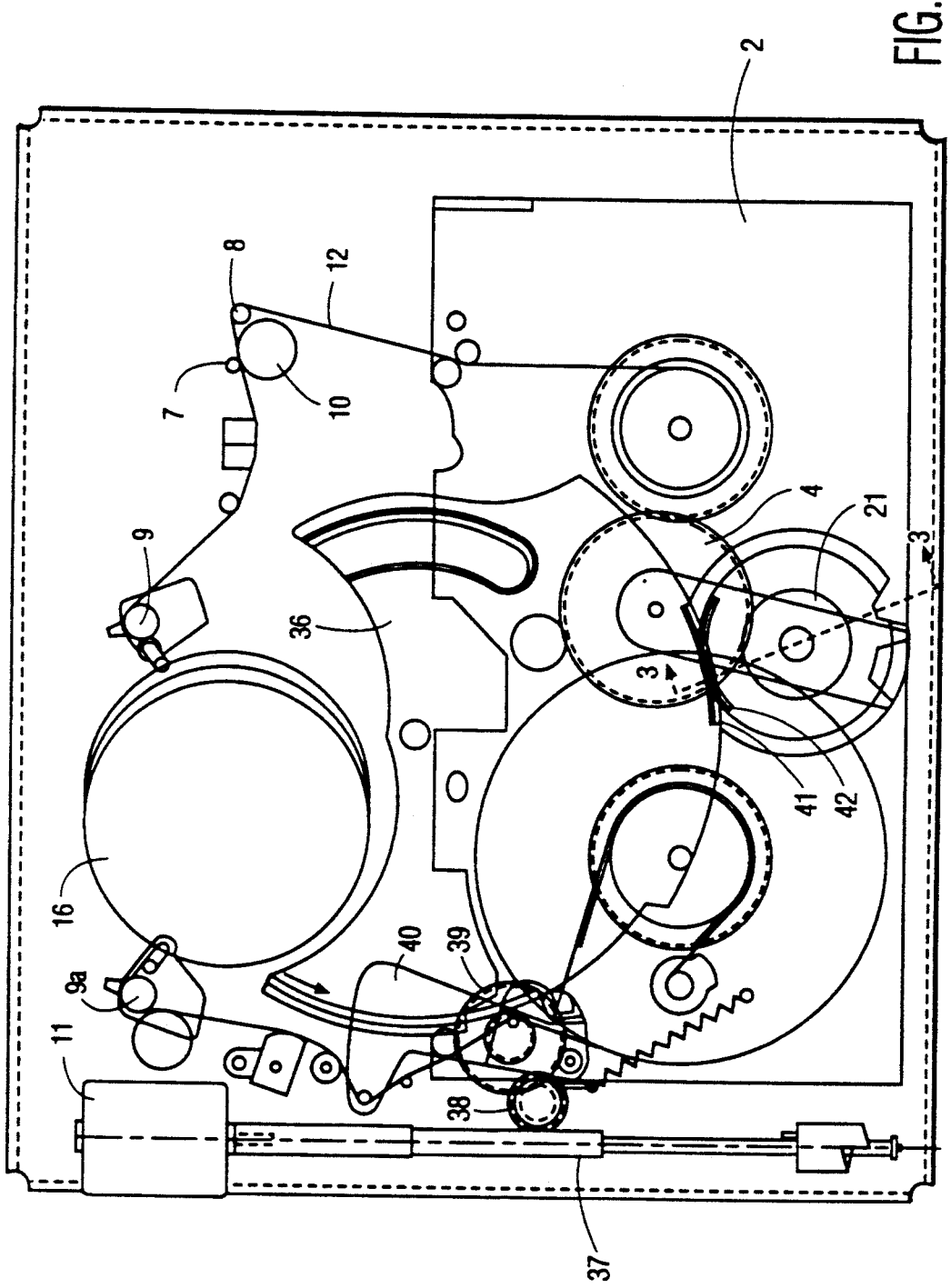
FIG. 3 is a top view of the preferred embodiment of FIG. 1 with the top plate removed to show a principle arrangement of the control mechanism.

FIG. 3 shows the reversing of the rotational direction of the tumbler gear by means of a cam disc 36 driven by the threading motor 11. The tape 12 is drawn out of the cassette 2 around the threading elements 8, 9 and 9a and placed around the head cylinder 16. The RI roll 10 urges the tape 12 onto the capstan shaft 7. The tape tension is adjusted by the tape tension sensor lever 40. The tumbler gear 4 is in the position for the play operation. In order to reverse the turning direction without moving the capstan shaft 7 while maintaining the tape tension, a drive voltage is fed to the threading motor 11 upon the input of a reversing command, for example from a microprocessor. The cam disc 36 is moved by the motor shaft 37, the intermediate wheel 38 and the driving wheel 39 in the direction of the arrow. The cam disc 36 meshes with the planet gear 21 via the toothed segment 41 and the height adjustable control ring 28 (FIG. 2) is turned a preselected angle.

Figure 4:
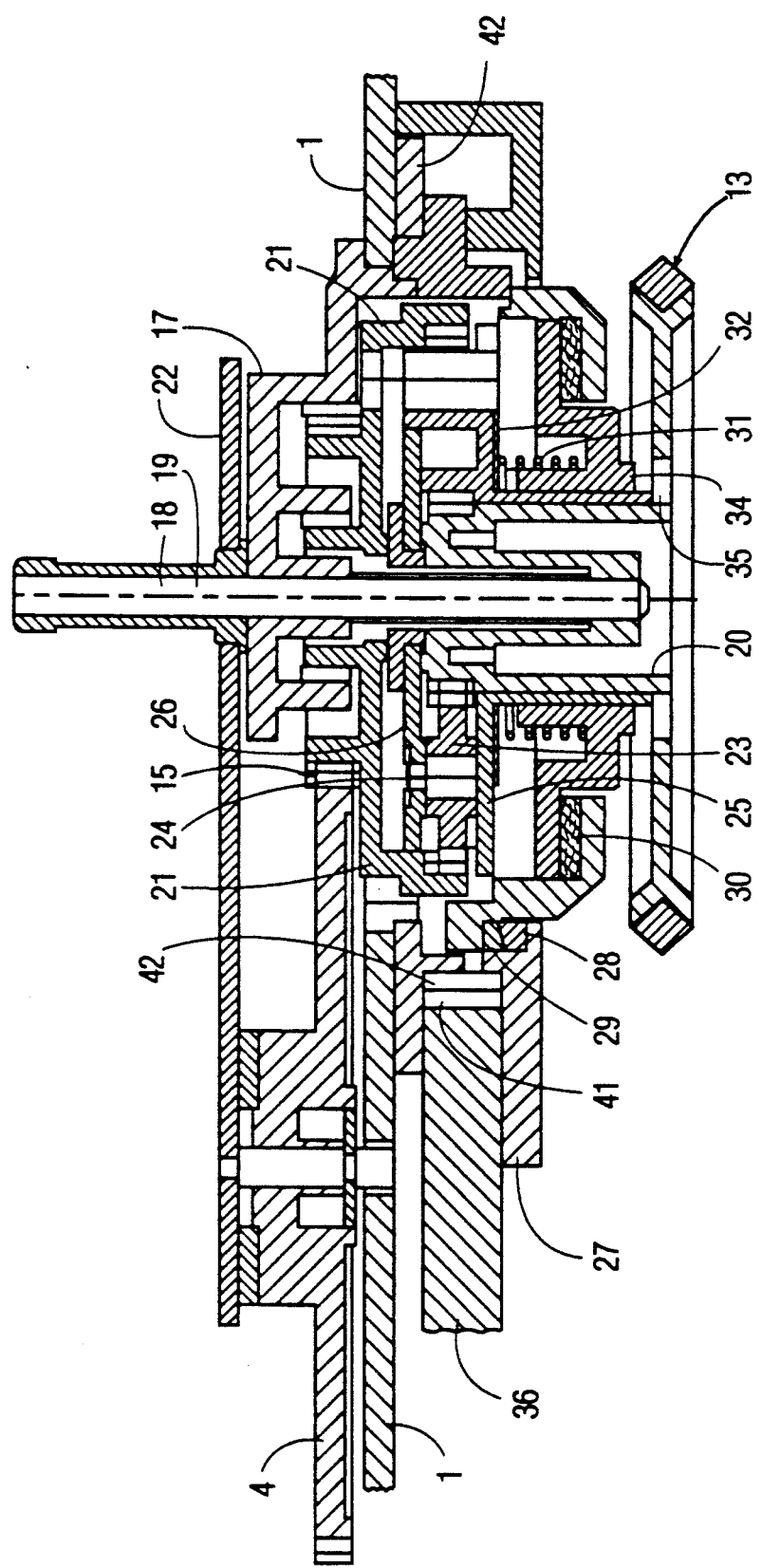
FIG. 4 is a cross section similar to FIG. 2, but taken along line 3—3 of FIG. 3.

FIG. 4 is a cross section showing how the height adjustment of the control ring 29 of the planet gear occurs. The representation of the planet gear corresponds in principle to that of FIG. 2. The cam disc 36 meshes with a set collar 42 via the toothed segment 41 and is rotatably supported in the chassis 1. Set collar 42 has an oblong groove or aperture 43 (not shown) into which a stopping nose 33 of the height adjustable control ring 29 locks, engages collar 42. The rotational movement of the cam disc 36 is transmitted to the stopping nose 33 via the set collar 42 and the operating element 43. Also, the planet wheels 26 are rotated via the clutch facing 30, to change the bell wheel 21 and the tumbler gear 4, which is affixed to the tumbler gear lever 22, to the desired mode of operation. The lever 27, is slidable moved by the threading motor 11, to adjust the height of the control ring 29 and change the clutch coupling.

We claim:

1. In a tape player/recorder device for a tape cassette having at least one winding reel driven by a capstan motor through a tumbler gear, the shaft of said motor being outside said cassette, a plurality of threading elements, an idler roller, and a threading motor for threading a tape in said player/recorder, an improvement comprising:

a planet gear coupled to said capstan motor and in engagement with said tumbler gear; and,
  a controllable slip coupling for selectively by-passing said planet gear.

2. The improvement of claim 1 wherein said slip coupling is controlled by said threading motor.

3. The improvement of claim 2 wherein said planet gear includes a sun wheel, a bell disc, and a plurality of planet wheels equiangularily spaced about said sun wheel, each of said planet wheels having a toothed perimeter for meshing with said sun wheel.

4. The improvement of claim 3 further including a cam disc for reversing the direction of rotation of said tumbler gear.

5. In a tape player/recorder device for a tape cassette having at least one winding reel driven by a capstan motor through a tumbler gear, the shaft of said motor being outside said cassette, a plurality of threading elements, an idler roller, and a threading motor for threading said tape in said player/recorder, an improvement comprising:

a planet gear responsive to said capstan motor and in engagement with said tumbler gear;

a slip coupling for selectively by-passing said planet gear wherein said slip coupling is controllable; and a lever and control means responsive to said threading motor for controlling said slip coupling through said lever.

6. The improvement of claim 5, wherein said control means includes an adjustable height coupling ring.

7. The improvement of claim 6, wherein said planet gear includes a sun wheel, a bell disc, and a plurality of planet wheels equiangularily spaced about said sun wheel, each of said planet wheels having a toothed perimeter for meshing with said sun wheel.

8. The improvement of claim 7, further including a cam disc for reversing the direction of rotation of said tumbler gear.

9. A tape recording and replay apparatus comprising:

a reel platter for winding a tape;

a capstan motor and a drive shaft for driving said tape;

a tumbler gear for driving said reel platter;

a planetary gear coupled to said tumbler gear and driven by said capstan motor; and, a controllable slip coupling coupled to said planetary gear for varying drive torque between said capstan motor and said tumbler gear.

10. The apparatus of claim 9, wherein said tape is housed in a cassette.

11. The apparatus of claim 10, wherein said drive shaft is external to said cassette.

12. The apparatus of claim 9, wherein said planetary gear has a geared reduction between a sun wheel and a bell wheel.

13. The apparatus of claim 9, wherein said controllable slip coupling is controlled to bypass said planetary gear.

14. The apparatus of claim 9, wherein said controllable slip coupling is controlled by a lever means.

15. The apparatus of claim 14, wherein said lever means is responsive to a tape threading motor.

16. The apparatus of claim 14, wherein said lever means varies a height of a frictional surface of said controllable slip coupling.

17. The apparatus of claim 9, wherein said controllable slip coupling tape is part of said planetary gear.

18. A tape recording and replay apparatus comprising:

a reel platter for winding a tape;

a capstan motor and a drive shaft for driving said tape;

an idler wheel for urging said tape against said drive shaft;

a tumbler gear pivotally mounted for driving said reel platter;

a planetary gear coupled to said tumbler gear and driven by said capstan motor; and, a controllable slip coupling being controlled to pivot said tumbler gear for driving a second reel platter.

19. The apparatus of claim 18, wherein said controllable slip coupling is controlled responsive to a tape threading motor.

20. The apparatus of claim 18, wherein said idler wheel urges said tape against said drive shaft and said tumbler gear is pivoted, responsive to a tape threading motor, for driving a second reel platter.

* * * * *